(12) United States Patent
Adelhelm

(10) Patent No.: US 6,590,149 B2
(45) Date of Patent: Jul. 8, 2003

(54) SOLAR SIMULATOR WITH MOVABLE FILTER

(75) Inventor: Ralf Adelhelm, Unterhaching (DE)

(73) Assignee: Astrium GmbH, Munich (DE)

( * ) Notice: Subject to any disclaimer, the term of this patent is extended or adjusted under 35 U.S.C. 154(b) by 173 days.

(21) Appl. No.: 09/826,306

(22) Filed: Apr. 5, 2001

(65) Prior Publication Data

US 2002/0122305 A1 Sep. 5, 2002

(30) Foreign Application Priority Data

Mar. 2, 2001 (DE) .................................. 201 03 645 U

(51) Int. Cl.$^7$ .................. H01L 31/052; F21V 9/02; F21V 9/06; F21V 9/04
(52) U.S. Cl. .................. 136/246; 136/290; 136/244; 136/291; 136/259; 250/504 R; 362/1; 362/2; 356/51
(58) Field of Search .................. 136/290, 244, 136/291, 246, 259; 250/504 R; 362/1, 2; 356/51

(56) References Cited

U.S. PATENT DOCUMENTS

| | | | |
|---|---|---|---|
| 4,125,775 A | * 11/1978 | Chodak | 250/504 R |
| 4,423,469 A | * 12/1983 | Zerlaut et al. | 362/2 |
| 4,467,438 A | * 8/1984 | Zerlaut et al. | 356/405 |
| 4,641,227 A | 2/1987 | Kusuhara | |
| 4,933,813 A | * 6/1990 | Berger | 362/2 |
| 5,217,285 A | * 6/1993 | Sopori | 362/1 |
| 5,334,844 A | * 8/1994 | Pollard et al. | 250/330 |
| 6,154,034 A | * 11/2000 | Lovelady et al. | 324/501 |

FOREIGN PATENT DOCUMENTS

EP 1139016 10/2001

OTHER PUBLICATIONS

Woodyard, "Laboratory Instrumentation and Techniques for Characterizing Multi–Junction Solar Cells for Space Applications," 25th PVSC, 1996, Washington DC, pp. 203–206.*

$28^{th}$ IEEE Photovoltaic Specialists Conference entitled "Matching of Multi Junction Solar Cells for Solar Array Production", Sep. 15–22, 2000, Anchorage, Alaska.

* cited by examiner

Primary Examiner—Alan Diamond
(74) Attorney, Agent, or Firm—Crowell & Moring LLP

(57) ABSTRACT

A solar simulator is provided having a radiation source for generating radiation with a spectral (energy) distribution that largely corresponds to the spectral distribution of sunlight. At least one filter is arranged in the region of the radiation source. This filter suppresses long wave or short wave radiation components of the radiation source. The filter is movable, basically perpendicular, to the irradiation direction of the radiation source. An irradiation plane capable of accommodating objects to be irradiated is set at a distance from the radiation source and the at least one filter such that the radiation coming directly from the radiation source, as well as the at least one filter, impinge on the irradiation plane as basically homogenous radiation of a punctiform light source.

20 Claims, 4 Drawing Sheets

SOLAR SIMULATOR WITH MOVABLE FILTER

This application claims the priority of German Application No. 201 03 645.2, filed Mar. 2, 2001, the disclosure of which is expressly incorporated by reference herein.

BACKGROUND AND SUMMARY OF THE INVENTION

The present invention concerns a solar simulator, especially a solar simulator that is usable for measuring solar cells.

Solar simulators serve to simulate natural sunlight in order to be able to investigate the effects of sunlight on certain objects to be irradiated. A special application is the examination of the performance of solar cells.

Such solar simulators are, for example, known from U.S. Pat. No. 4,641,227. There, a simulation of sunlight is realized through a suitable arrangement that filters two independent sources of radiation, and subsequently superposes the radiations coming from these radiation sources. Nonetheless, the relatively high construction expenditure of the radiation sources' arrangement as well as of the optical system is disadvantageous. Also, the variation breadth of the radiation generated through the given optical system is relatively small.

There is therefore needed a simplified and variable solar simulator arrangement. This need is met by providing a solar simulator having a radiation source for generating radiation with a spectral (energy) distribution that largely corresponds to the spectral distribution of sunlight. At least one filter is arranged in the region of the radiation source. This filter suppresses long wave or short wave radiation components of the radiation source. The filter is movable, basically perpendicular, to the irradiation direction of the radiation source. An irradiation plane capable of accommodating objects to be irradiated is set at a distance from the radiation source and the at least one filter such that the radiation coming directly from the radiation source, as well as the at least one filter, impinge on the irradiation plane as basically homogenous radiation of a punctiform light source.

The solar simulator of the present invention has the following: a radiation source for generating radiation with a spectral distribution which largely corresponds to the spectral distribution of sunlight; at least one filter arranged in the region of the radiation source which suppresses long wave or short wave radiation components of the radiation source and is arranged movable, basically perpendicular, to the irradiation direction of the radiation source; and an irradiation plane with facilities for accommodating objects to be irradiated which is set at a distance from the radiation source and the at least one filter such that the radiation proceeding directly from the radiation source as well as the at least one filter impinge on the irradiation plane as basically homogenous radiation of a punctiform light source.

Consequently, in contrast to the state of the art, only a single radiation source is required, which basically simplifies the arrangement. Owing to at least one movable filter, the composition of radiation, thus the components of long wave and short wave radiation components, can be varied in a relatively wide range, and the desired radiation spectrum can be optimally adjusted. Since the irradiation plane is nevertheless so arranged that the radiation source and the radiation passing through at least one filter can practically be viewed as a single point source, one obtains, despite this, a homogenous irradiation on the irradiation plane and not an imaging of the radiation source and filter which could lead to a locally different radiation spectrum.

In particular, the radiation (light) source can be constructed as a flash lamp, for example, as a xenon flash lamp.

In order for the radiation source to develop the action of a point source, it is especially provided that the distance between the radiation source and the filter corresponds to the order of magnitude of the radiating electric arc or lamp or other radiating facility which serves as a radiation source. One possibility for realizing a homogenous irradiation on the irradiation plane is for the distance between the irradiation plane and the radiation source to come to at least 50 times, preferably at least 100 times, the distance between at least one filter and the source of irradiation.

For a special use of the solar simulator for measuring solar cells, it can be provided that a solar cell to be measured is arranged on the irradiation plane and that, moreover, additional reference solar cells are arranged on the irradiation plane for comparative measurements. In this way, the same irradiation acts on the reference solar cells as upon the solar cells to be measured in each case. For example, the solar cells to be measured can be constructed such that at least a first solar cell layer is arranged over a second solar cell layer, whereby the solar cell layers have a different absorption behavior. Such solar cells are especially familiar as dual junction solar cells or also as multi-junction solar cells. The reference solar cells are then formed by at least a first reference solar cell layer with one absorption behavior, which corresponds to at least a first solar cell layer. It is also formed by at least a second reference solar cell layer adjacent to the first reference solar cell layer, the absorption behavior of which corresponds to the second solar cell layer, whereby a filter which corresponds to the absorption behavior of the first solar cell layer is placed in front of the second reference solar cell layer. The reference solar cell layers are in this way independent from one another, but they nonetheless simulate the circumstances within solar cells arranged one above another, which are to be measured.

In order to be able to vary the radiation spectrum occurring on the irradiation plane even further, it can be provided that at least two filters are basically arranged movable perpendicular to the direction of irradiation, whereby the filter is constructed such that they suppress different radiation components in any given case. In this way, a superposition of radiation components, which have not passed through any filters, with radiation components which have passed through the first filter and irradiation components which have passed through the second filter or even additional filters now results as an overall spectrum. Making the filters slide one over the other results also in additional irradiation components that have first passed through a first filter and then a second, or still further filters.

Other objects, advantages and novel features of the present invention will become apparent from the following detailed description of the invention when considered in conjunction with the accompanying drawings.

DETAILED DESCRIPTION OF THE DRAWINGS

Figure 1:
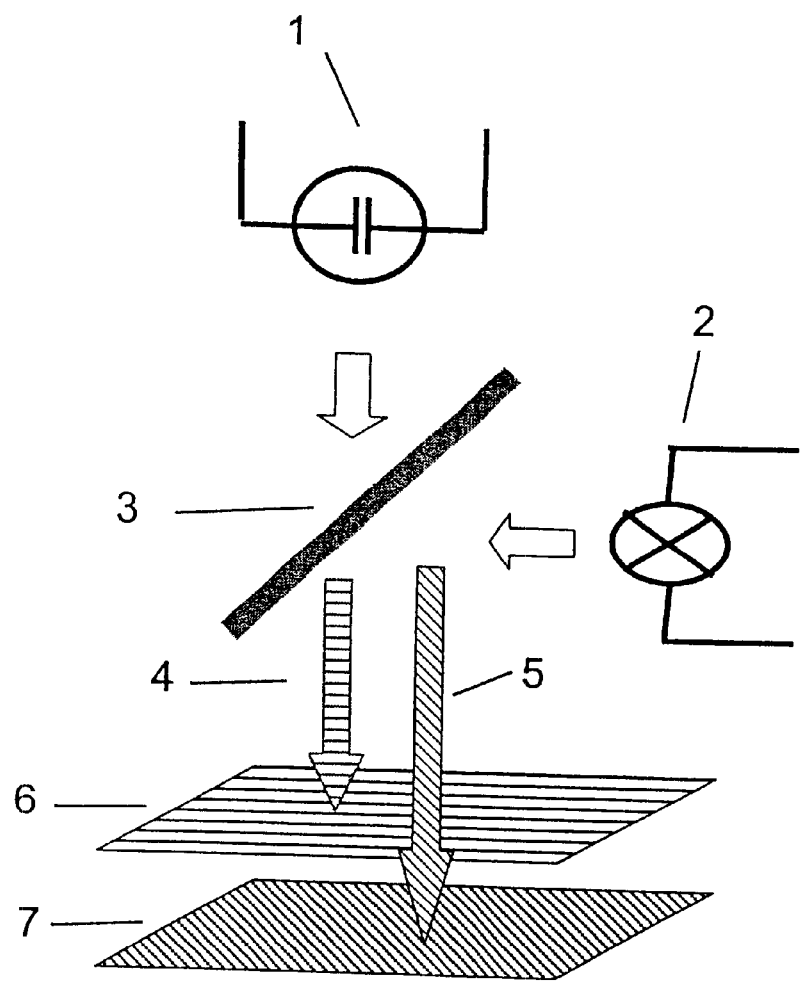
FIG. 1 is a schematic diagram illustrating a state of the art solar simulator.
Figure 3:
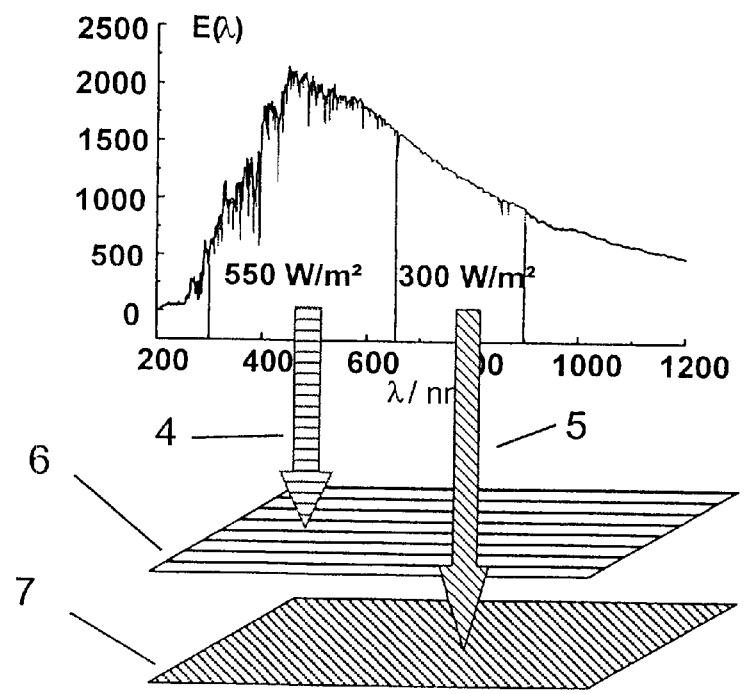
FIG. 3 is a schematic representation of the absorption behavior of the solar cells to be measured.

In FIG. 1, a solar simulator according to the state of the art is schematically represented. This simulator has two radiation sources 1 and 2. A filter 3 filters out the long wave part of the irradiation passing through the filter 3 of the first radiation source 1 so that only the short wave component 4 of the radiation from this radiation source 1 passes through the filter 3. The radiation 5 of the second radiation source 2, which in this case has a high long wave component, is reflected in the direction of the radiation 4 of the first radiation source 1, owing to which both irradiations 4, 5 superpose into an overall radiation spectrum. This can be used to measure solar cells 6, 7, for example, for measuring the solar cells that are built up on the basis of solar cell layers 6, 7 arranged one over the other, i.e. the so-called "dual junction" or "multi-junction" solar cells. These absorb, in an upper layer, chiefly a first part of the incident irradiation, for example, according to FIG. 1, mainly the short wave component 4. The long wave component 5 largely passes through this upper layer 6 and is first absorbed in a deeper lying layer 7. This is made clear in FIG. 3 in which the different absorption of various wave length regions of the irradiation spectrum $E(\lambda)$ is represented. In this way, both layers 6, 7 contribute to an effective utilization of the energy of the incident radiation 4, 5 owing to their different absorption behavior and therewith to a higher generation of photoelectric current.

Figure 2:
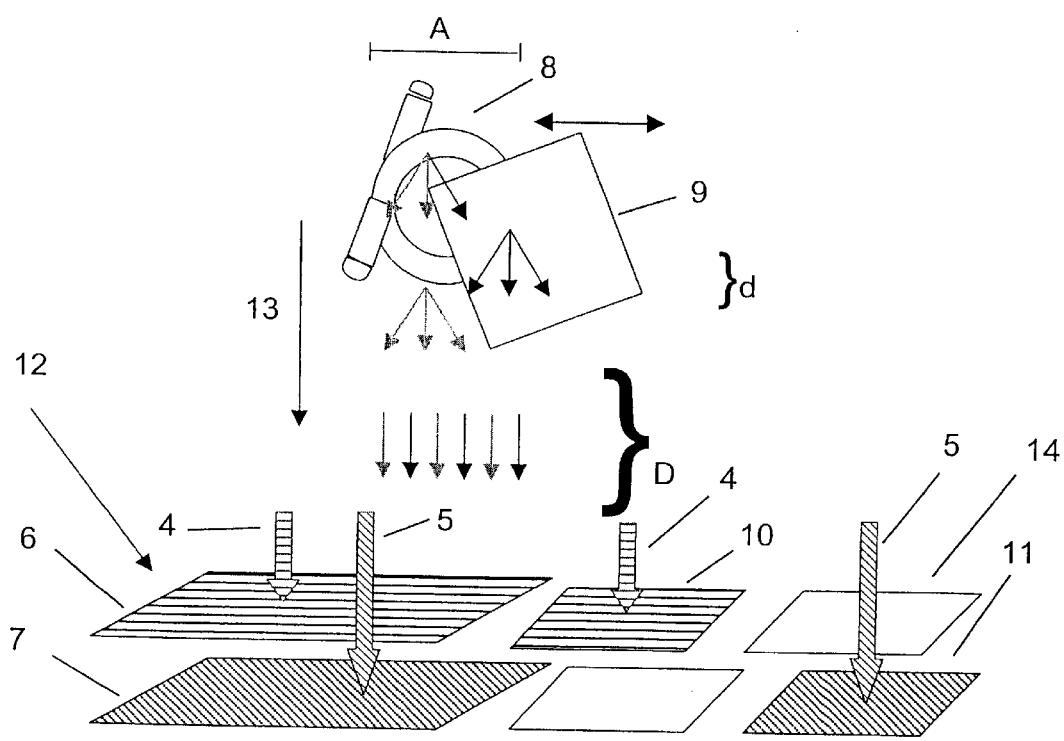
FIG. 2 is a schematic representation of a solar simulator according to the present invention.

FIG. 2 shows an arrangement according to the invention where instead of two irradiation sources, only a single irradiation source 8 is needed. This economy is achieved by arranging a movable filter 9. The filter 9 absorbs one part of the radiation generated by the radiation source 8 at a short distance d from the radiation source 8 and perpendicular to the direction of irradiation 13. The filter 9 can either suppress the long wave or the short wave component of the radiation to a defined extent. This extent can be adjusted as required by a suitable choice of filter. In this way, a variable portion of the beamed irradiation can be filtered and the composition of the overall spectrum can thus be adjusted on the basis of radiation proceeding directly from the irradiation source 8 and radiation passing through the filter 9. In particular, a xenon flash lamp can be used as the radiation source 8.

In order for the irradiation source 8 to develop the action of a point source, it is especially provided that the distance "d" from the irradiation source and the filter corresponds to the order of magnitude of the extension A of the radiation source 8, thus to the order of magnitude of the radiating electric arc, lamp or other radiating facility which serves as the radiation source 8. Thus, for example, the extension A of radiation source 8 as well as distance d can lie in the centimeter range.

The radiation falls upon an object to be irradiated, in the case of FIG. 2 upon solar cells 6, 7, 10, 11 on an irradiation plane 12 at distance "D" from the radiation source. In order that a homogenous illumination arises there through the irradiation mixture of filtered and non-filtered radiation, and not an imaging of radiation source 8 and filter 9 with possibly associated locally different radiation spectrum, the distance D is selected to be so large relative to distance d that the distance D comes to at least 50 times distance d, ideally at least 100 times. Thus d can lie in the range of a few centimeters, D in the range of a few meters.

Figure 4:
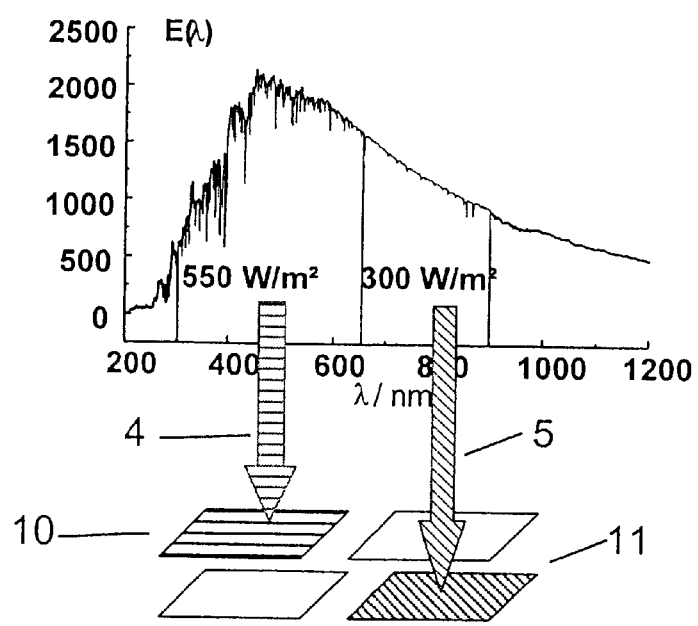
FIG. 4 is a schematic representation of the absorption behavior of the reference solar cells.

The solar cells 6, 7 are preferably constructed as previously described dual junction or multi-junction solar cells. The individual layers 6, 7 therefore likewise manifest a different absorption behavior according to FIG. 3. In order to be able to measure unambiguously the action of the radiation 4, 5 falling on these solar cell layers 6, 7, reference solar cells 10, 11 are ideally arranged alongside one another on the irradiation plane 12. Of these, a first reference solar cell 10 simulates the behavior of the uppermost layer 6, a further reference solar cell 11 simulates the behavior of the lower layer 7. In order to correspondingly take the absorption behavior of the upper layer 6 into consideration, the reference solar cell 11 is provided with a suitable filter 14, which simulates the absorption behavior of the upper layer 6. In this way, the two reference solar cells 10, 11 can reproduce the behavior of the corresponding layers 6, 7 of the solar cells 6, 7 to be measured independently of each other, as FIG. 4 illustrates. The reference cell 10, analogous to layer 6, is overwhelmingly active for short wave components 4 of the radiation of the spectrum $E(\lambda)$, and reference cell 11 is active for the long wave components 5. To the extent that more than two layers 6, 7 are present, ideally correspondingly more reference solar cells 10, 11 are to be provided.

Figure 5:
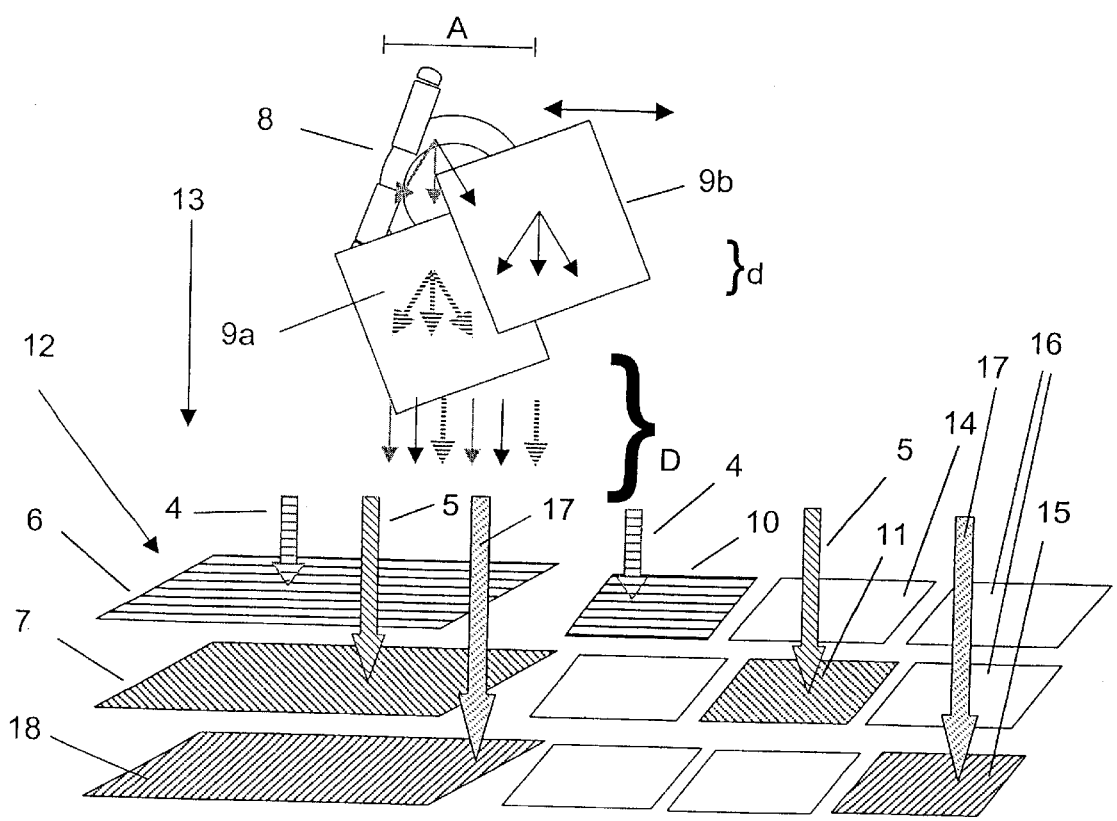
FIG. 5 illustrates a solar simulator according to FIG. 2, but with more than one filter.

In FIG. 5, a further embodiment of the invention is represented using more than one filter. There, two filters 9a, 9b are illustrated which are movable perpendicular to the irradiation direction 13. Basically, more than two filters 9a, 9b are also possible. These filters 9a, 9b suppress different components of the radiation from the irradiation source 8 and therewith generate different radiation components which are superposed on the irradiation plane 12 into an overall spectrum. Filters 9a, 9b can also be arranged such that they can be made to slide one over the other so that a still further radiation component can be generated, which results from the fact that the radiation of the irradiation source 8 first passes through a first filter 9a and then through a second filter 9b. Such an arrangement can, in particular, be used for measuring multi-junction solar cells 6, 7, 18, which consist of more than two individual layers 6, 7, 18. Correspondingly, likewise an equal number of reference solar cells 10, 11, 15 should also be provided, which are active for appropriate components 4, 5, 17 of the irradiation spectrum. For this, once again, suitable filters 14, 16 are placed before some of the reference solar cells 10, 11, 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A solar simulator, comprising:
    a radiation source generating radiation having a spectral distribution predominately corresponding to a spectral distribution of sunlight;
    at least one filter arranged near the radiation source so as to be movable, substantially perpendicular to an irradiation direction of the radiation source, said filter suppressing long wave or short wave radiation components from the radiation source and said filter being also moveable to filter a variable portion of the irradiation as the at least one filter moves in said perpendicular direction;
    an irradiation plane adapted to accommodate objects to be irradiated, said plane being set at a distance from the radiation source and the at least one filter such that radiation coming directly from the radiation source, as well as the at least one filter, impinges on the radiation plane as essentially homogenous radiation of a punctiform light source.

2. The solar simulator according to claim 1, wherein the radiation source is a flash lamp.

3. The solar simulator according to claim 2, wherein the radiation source is a xenon flash lamp.

4. The solar simulator according to claim 1, wherein a distance (d) between the at least one filter and the radiation source corresponds to an order of magnitude of an extension of the radiation source.

5. The solar simulator according to claim 2, wherein a distance (d) between the at least one filter and the radiation source corresponds to an order of magnitude of an extension of the radiation source.

6. The solar simulator according to claim 3, wherein a distance (d) between the at least one filter and the radiation source corresponds to an order of magnitude of an extension of the radiation source.

7. The solar simulator according to claim 1, wherein a distance (D) between the irradiation plane and the radiation source is approximately at least 50 times a distance (d) between the at least one filter and the radiation source.

8. The solar simulator according to claim 2, wherein a distance (D) between the irradiation plane and the radiation source is approximately at least 50 times a distance (d) between the at least one filter and the radiation source.

9. The solar simulator according to claim 3, wherein a distance (D) between the irradiation plane and the radiation source is approximately at least 50 times a distance (d) between the at least one filter and the radiation source.

10. The solar simulator according to claim 4, wherein a distance (D) between the irradiation plane and the radiation source is approximately at least 50 times the distance (d) between the at least one filter and the radiation source.

11. The solar simulator according to claim 7, wherein the distance (D) between the irradiation plane and the radiation source is approximately at least 100 times the distance (d) between the at least one filter and the radiation source.

12. The solar simulator according to claim 1, further comprising:
    solar cells arranged on the irradiation plane, said solar cells being measured; and
    reference solar cells arranged on the radiation plane to provide comparative measurements.

13. The solar simulator according to claim 2, further comprising:
    solar cells arranged on the irradiation plane, said solar cells being measured; and
    reference solar cells arranged on the radiation plane to provide comparative measurements.

14. The solar simulator according to claim 3, further comprising:
    solar cells arranged on the irradiation plane, said solar cells being measured; and
    reference solar cells arranged on the radiation plane to provide comparative measurements.

15. The solar simulator according to claim 4, further comprising:
    solar cells arranged on the irradiation plane, said solar cells being measured; and
    reference solar cells arranged on the radiation plane to provide comparative measurements.

16. The solar simulator according to claim 7, further comprising:
    solar cells arranged on the irradiation plane, said solar cells being measured; and
    reference solar cells arranged on the radiation plane to provide comparative measurements.

17. The solar simulator according to claim 12, wherein the solar cells being measured comprise at least a first solar cell layer arranged over a second solar cell layer, each of the solar cell layers having a different absorption behavior;
    wherein the reference solar cells comprise at least a first reference solar cell layer having an absorption behavior corresponding to the at least one first solar cell layer, and a second reference solar cell layer adjacent to the first reference solar cell layer having an absorption behavior corresponding to the second solar cell layer, and before which a filter is arranged corresponding to the absorption behavior of the first solar cell layer.

18. The solar simulator according to claim 1, further comprising at least a second filter, said first and second filters being movable substantially perpendicular to the direction of radiation, wherein the first and second filters are constructed to suppress different components of radiation for any given case.

19. The solar simulator according to claim 18, wherein the first and second filters are arranged to slide over one another.

20. A solar simulator, comprising:
    a radiation source generating radiation having a spectral distribution predominately corresponding to a spectral distribution of sunlight;
    at least two filters arranged near the radiation source so as to be movable substantially perpendicular to an irradiation direction of the radiation source so that a variable portion of the irradiation can be filtered and the at least two filters being movable with respect to each other to provide multiple irradiation components with one component passing through a first filter and a second component passing through a second filter with a third component passing through both said first and second filter;
    an irradiation plane adapted to accommodate objects to be irradiated, said plane being set at a distance from the radiation source and the at least two filters such that radiation coming directly from the radiation source, as well as the at least two filters, impinge on the radiation plane as essentially homogenous radiation of a punctiform light source.

* * * * *